United States Patent
McMullen

(10) Patent No.: US 10,834,171 B2
(45) Date of Patent: *Nov. 10, 2020

(54) CONFIGURATION CHANGE PROCESSING FOR CONTENT REQUEST HANDLING

(71) Applicant: Fastly, Inc., San Francisco, CA (US)

(72) Inventor: Tyler McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,609

(22) Filed: May 9, 2018

(65) Prior Publication Data

US 2018/0262553 A1 Sep. 13, 2018

Related U.S. Application Data

(63) Continuation of application No. 14/013,518, filed on Aug. 29, 2013, now Pat. No. 9,992,260.

(60) Provisional application No. 61/695,473, filed on Aug. 31, 2012.

(51) Int. Cl.
*H04L 29/08* (2006.01)

(52) U.S. Cl.
CPC .......... *H04L 67/06* (2013.01); *H04L 67/1097* (2013.01); *H04L 67/34* (2013.01)

(58) Field of Classification Search
CPC ...... H04L 67/06; H04L 67/34; H04L 67/1097
See application file for complete search history.

(56) References Cited

U.S. PATENT DOCUMENTS

| | | | | |
|---|---|---|---|---|
| 7,149,797 B1* | 12/2006 | Weller | .................. | G06Q 40/04 709/223 |
| 8,275,851 B1* | 9/2012 | Sakata | .................... | G06F 9/541 709/213 |
| 9,087,020 B1* | 7/2015 | Amacker | .............. | G06F 16/958 |
| 2002/0052942 A1* | 5/2002 | Swildens | ................ | G06F 9/505 709/223 |
| 2003/0065763 A1* | 4/2003 | Swildens | ................ | H04L 12/14 709/224 |
| 2003/0097564 A1* | 5/2003 | Tewari | .................... | H04L 12/14 713/171 |
| 2004/0111613 A1* | 6/2004 | Shen-Orr | ................ | G06F 21/10 713/165 |
| 2005/0033858 A1* | 2/2005 | Swildens | .......... | H04L 29/12066 709/232 |
| 2005/0080801 A1* | 4/2005 | Kothandaraman | ..... | H04L 67/06 |
| 2005/0097445 A1* | 5/2005 | Day | ........................ | H04L 12/14 715/255 |

(Continued)

FOREIGN PATENT DOCUMENTS

CN 107786668 A * 3/2018

*Primary Examiner* — Kostas J Katsikis

(57) ABSTRACT

Disclosed herein are methods, systems, and software for configuration change processing for end-user content request handling in content delivery nodes. In one example, a method of changing a content configuration for a content delivery node includes receiving a configuration change request by an end user. The method further provides, processing the configuration change request and a present configuration to generate a changed configuration comprising an assembly level code representation of the changed configuration, and transferring the changed configuration for delivery to the content delivery node.

14 Claims, 4 Drawing Sheets

(56) References Cited

U.S. PATENT DOCUMENTS

| | | | |
|---|---|---|---|
| 2006/0112176 A1* | 5/2006 | Liu | H04L 29/12066 709/245 |
| 2007/0174426 A1* | 7/2007 | Swildens | H04L 12/14 709/217 |
| 2008/0281945 A1* | 11/2008 | Gill | H04L 12/1859 709/219 |
| 2009/0210528 A1* | 8/2009 | Swildens | H04L 12/14 709/224 |
| 2009/0248871 A1* | 10/2009 | Takase | H04L 47/10 709/226 |
| 2010/0125649 A1* | 5/2010 | Day | H04L 29/12066 709/219 |
| 2010/0235376 A1* | 9/2010 | Sukanen | G06F 17/30749 707/769 |
| 2010/0250710 A1* | 9/2010 | Cadwell | H04L 67/1008 709/219 |
| 2011/0276679 A1* | 11/2011 | Newton | H04N 21/23103 709/224 |
| 2011/0296473 A1* | 12/2011 | Babic | H04N 21/21 725/87 |
| 2011/0296474 A1* | 12/2011 | Babic | H04N 21/21 725/87 |
| 2012/0054265 A1* | 3/2012 | Kazerani | H04L 43/0811 709/203 |
| 2012/0054266 A1* | 3/2012 | Kazerani | H04L 41/5067 709/203 |
| 2012/0084399 A1* | 4/2012 | Scharber | H04L 67/34 709/219 |
| 2012/0096099 A1* | 4/2012 | Dennis | G06Q 10/107 709/206 |
| 2012/0124184 A1* | 5/2012 | Sakata | H04L 61/1511 709/220 |
| 2012/0179814 A1* | 7/2012 | Swildens | H04L 12/14 709/224 |
| 2012/0284252 A1* | 11/2012 | Drai | G06F 17/30864 707/709 |
| 2013/0159473 A1* | 6/2013 | Newton | H04L 67/2852 709/219 |
| 2013/0191499 A1* | 7/2013 | Ludin | H04L 61/1511 709/217 |
| 2014/0149548 A1* | 5/2014 | Chhabra | H04N 21/2181 709/217 |
| 2014/0215059 A1* | 7/2014 | Astiz Lezaun | H04L 67/1008 709/224 |
| 2014/0344399 A1* | 11/2014 | Lipstone | H04L 41/509 709/217 |
| 2017/0201564 A1* | 7/2017 | Hardwick | H04L 65/607 |

* cited by examiner

CONFIGURATION CHANGE PROCESSING FOR CONTENT REQUEST HANDLING

RELATED APPLICATIONS

This application is a continuation of, and claims priority to, U.S. application Ser. No. 14/013,518, entitled "CONFIGURATION CHANGE PROCESSING FOR CONTENT REQUEST HANDLING IN CONTENT DELIVERY NODE," filed on Aug. 29, 2013, which claims the benefit of and priority to U.S. Provisional Patent Application 61/695,473, titled "CONFIGURATION CHANGE PROCESSING FOR CONTENT REQUEST HANDLING IN CONTENT DELIVERY NODE," filed Aug. 31, 2012, both of which are hereby incorporated by reference in their entirety.

TECHNICAL BACKGROUND

Network-provided content, such as Internet web pages or media content, such as video, pictures, music, and the like, are typically served to end users via networked computer systems. End user requests for the network content are processed and the content is responsively provided over various network links. These networked computer systems can include origin hosting servers, which originally host network content of content creators or originators, such as web servers for hosting a news website. However, these computer systems of individual content creators can become overloaded and slow due to frequent requests of content by end users.

Content delivery systems have been developed which add a layer of caching between the origin servers of the content providers and the end users. The content delivery systems typically have one or more content delivery nodes distributed across a large geographic region to provide faster and lower latency access to the content for the end users. When end users request content, such as a web page, the content delivery node is configured to respond to the end user requests instead of the origin servers. In this manner, a content delivery node can act as a proxy for the origin servers.

Content of the origin servers can be cached into the content delivery nodes, and can be requested via the content delivery nodes from the origin servers of the content originators when the content has not yet been cached. Content delivery nodes usually cache only a portion of the original source content rather than caching all content or data associated with an original content source. The content delivery nodes can thus maintain only recently accessed and most popular content as cached from the original content sources. Thus, content delivery nodes exchange data with the original content sources when the end users request new or un-cached information or if something has changed in the original content source data.

Content delivery nodes typically include conventional computer systems and server equipment that are similar to those found in the origin server equipment. Accordingly, various slowdowns and latency problems can exist in these nodes due to the components and software, such as data storage using spinning hard disk drives, poor management of caching processes, and slow handling of changes to the original content and content configurations.

Overview

Disclosed herein are methods, systems, and software for configuration change processing for end-user content request handling in content delivery nodes. In one example, a method of changing a content configuration for a content delivery node includes receiving a configuration change request by an end user. The method further provides, processing the configuration change request and a present configuration to generate a changed configuration comprising an assembly level code representation of the changed configuration, and transferring the changed configuration for delivery to the content delivery node.

In another example, a computer readable medium having program instructions stored thereon that, when executed by a configuration processing node, direct the configuration processing node to receive a configuration change request by an end user. The program instructions further direct the configuration processing node to process the configuration change request and a present configuration to generate a changed configuration comprising an assembly level code representation of the changed configuration, and transfer the changed configuration for delivery to a content delivery node.

In a further instance, a system includes at least one content delivery node configured with a present configuration. The system further includes a configuration processing node configured to receive a configuration change request by an end user, process the configuration change request and the present configuration to generate a changed configuration comprising an assembly level code representation of the changed configuration, and transfer the changed configuration for delivery to a content delivery node.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Figure 1:
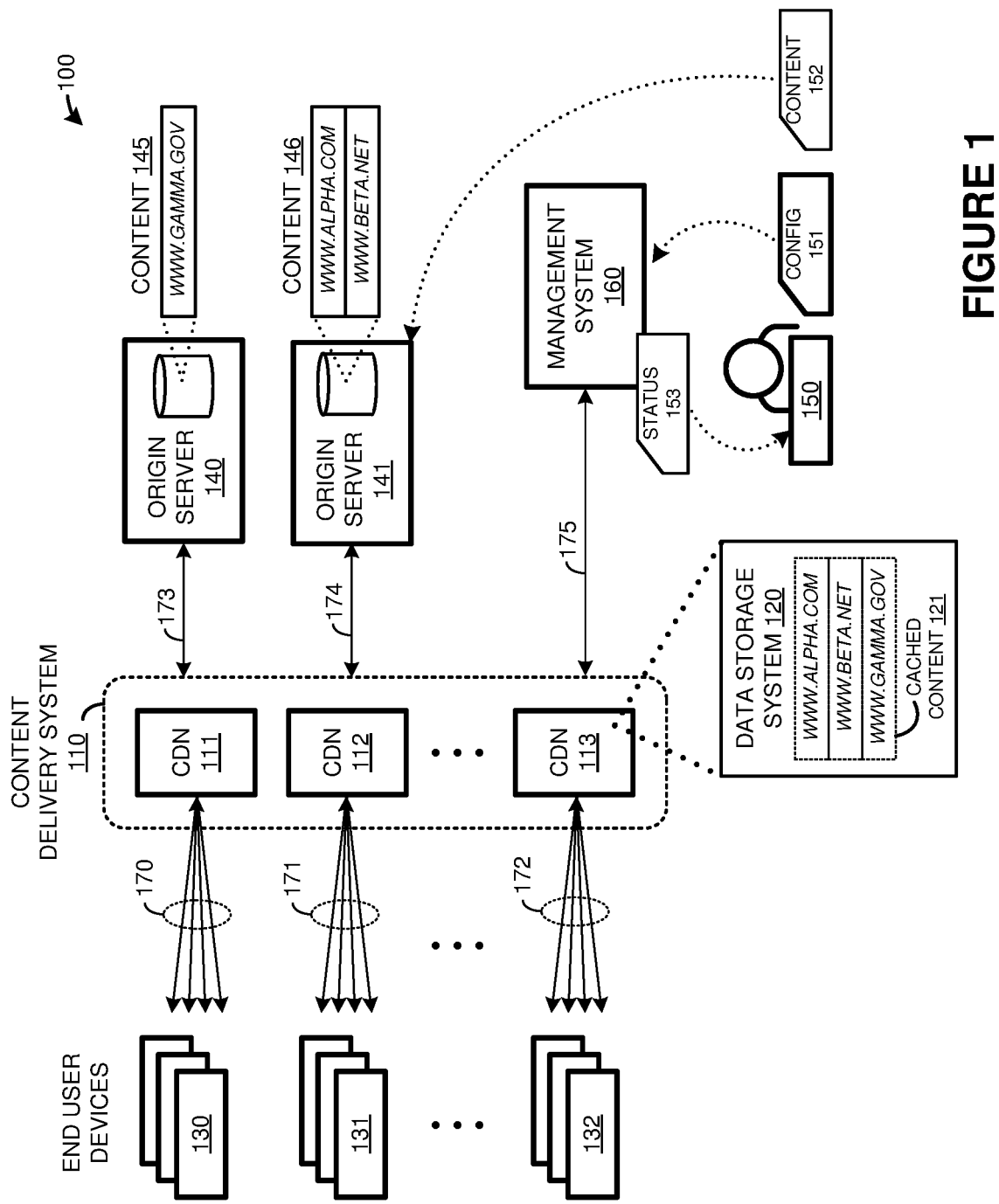
FIG. 1 is a system diagram illustrating a communication system.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. The network content includes example website content referenced in FIG. 1, such as "www.gamma.gov," "www.alpha.com," and "www.beta.net," among others, including associated pathnames, port numbers, and the like. In some examples, origin servers can serve the content to end user devices. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes, instead of network addresses of the origin servers using domain name system (DNS) registration and lookup procedures. This association of content requests and content can be referred to as a content configuration.

As discussed above, when an end user device requests network content, such as a website over a network link, the content request can be received and handled by a content delivery node instead of by an origin server. Responsive to the content request, the node processes the request using a content configuration to determine how to handle the content request. For example, an end user device can transfer a content identifier such as a uniform resource locator (URL), pathname, and port number to a node with the request for network content associated with that content identifier. The node can process the content identifier to determine a configuration for how to handle the content request. This processing can include conditional processing using the URL as an input parameter, and a corresponding configuration for handling the URL can be identified. Although the term content identifier is used herein, it should be understood that a uniform resource locator (URL), uniform resource identifier (URI), uniform resource name (URN), path name, port number, network address, domain name, IP address, or combinations and portions thereof, can be employed.

In many content delivery system examples, multiple network content sources are handled by a single node. For example, a node can be configured to cache website content of many different website content originators. The node, when processing an end user device request for network content, typically must process the content request against a list of all of the various content sources to determine which configuration associated with a particular content source is to be employed. As discussed above, this processing can include processing a content identifier against a list of content identifiers to determine a configuration file or configuration data set associated with the particular content identifier. Each content identifier handled by a node can be mapped to one or more configuration files.

However, this configuration processing, referred to herein as "front-end processing," can become cumbersome and slow when a node handles a large number of content sources, such as a large number of content identifiers or web pages. Additionally, a node can experience slowdowns and processing lag when changes or alterations to the handling configurations associated with the content identifiers are required. Thus, requested changes can take an undesirable amount of time to implement. A content originator or an operator of the node can initiate these changes or alterations for associating URLs, domain names, network addresses, IP addresses, or other identifiers of network content with handling configuration information for the network content.

In one instance, to make alterations or changes to the front-end processing of a node, the alteration or change is first identified. Then, assembly code reflecting the alteration or change is generated. The front-end processing is then updated with the new executable code based on the assembly code, and end user device requests can be handled according to the updated front-end processing executable code.

In conventional systems, these changes are typically made via high-level programming languages, such as using C, C++, Java, C #, or other high-level programming languages. In other examples, a scripting or interpreted language, such as Varnish Configuration Language (VCL), Javascript, PHP, and the like are used to handle the changes. However, when high-level languages are employed, implementing changes takes an undesirable amount of time and processing. For example, in a high-level compilable language, the user-readable code must first be optimized and compiled, among other operations, before executable code is generated. Scripting and interpreted languages can suffer from similar limitations during interpretation processing. Thus, in the examples herein, low-level assembly code is generated directly from an indication of the configuration changes. Executable machine code can then be generated quickly from the assembly code for execution by front-end processing portions of a node.

In an example of a high-level programming language, an "if-then-else" type of statement can be employed, such as:

```
if content identifier == "www.alpha.com" then
    use "alpha configuration"
elseif content identifier == "www.beta.com" then
    use "beta configuration"
elseif content identifier == "192.168.1.1" then
    use "beta configuration"
else
    warn "We don't know about that content identifier"
end
```

However, when the number of content identifiers, such as domain names or IP addresses, becomes large, the processing can become slow because high-level programming languages are not generally optimized for such processing. Another possible front-end processing architecture is to embed a high-level code snippet into a scripting language, but this leads to similar slowdowns in a purely script-based environment. In order to make if-then-else statements fast at run-time, a C-compiler does optimizations at compile time. If C code is embedded in a scripting language, the compiler/optimizer must be run every time a change is made. As the number of content identifiers increase, the compile/optimization time increases greatly. Instead of implementing changes immediately, batching the changes to be implemented at a periodic rate can be employed. However, batching changes does not produce a desirable outcome, as the configuration changes are delayed until the periodic implementation, and real-time changes would not be possible.

In one example discussed herein, a scripting language, such as the VCL scripting language discussed above, can embed assembly code in a script or scripting code written in the associated scripting language. Thus, assembly code reflecting the configuration handling information can be generated and embedded into the scripting code to quickly render executable code from the assembly code without the delays and slowdowns related to the optimization stages of a compiler.

As a first example employing a content delivery system, FIG. 1 is presented. FIG. 1 is a system diagram illustrating communication system 100. Communication system 100 includes content delivery system 110, end user devices 130-132, origin servers 140-141, and management system 160. Content delivery system 110 includes one or more content delivery nodes (CDN) 111-113. Each node 111-113 can include one or more data storage systems, such as that illustrated for node 113 as data storage system 120. End user devices 130-132 are representative of a plurality of end user devices that can request and receive network content, and any number of end user devices 130-132 can be associated with each of content delivery nodes 111-113. Nodes 111-113 and ones of end users 130-132 communicate over associated network links 170-172. Content delivery system 110 and origin servers 140-141 communicate over associated network links 173-174. Content delivery system 110 and management system 160 communicate over link 175. Although not shown in FIG. 1 for clarity, each of nodes 111-113 can also communicate with each other over network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content delivery nodes 111-113 of content delivery system 110 receive the content requests over ones of links 170-172. Nodes 111-113 then process content identifiers in the content requests for delivery of the content to the associated end user devices 130-132. Requested network content that is already stored in ones of nodes 111-113 can be provided quickly to the end user devices, while network content, that is not already stored in ones of nodes 111-113, can be responsively requested by an associated one of nodes 111-113 from an appropriate origin server 140-141 for delivery by the node and possible caching by the node. In this manner, each of nodes 111-113 can act as intermediary proxy nodes to provide local and fast access for end user devices 130-132 to network content of origin servers 140-141 without burdening origin servers 140-141. FIG. 1 illustrates cached content 121 included in data storage system 120 of node 113 as comprised of content 145-146, and thus content 145-146 is currently shown as cached by node 113. Other configurations are possible, including subsets of content 145-146 being cached in individual ones of nodes 111-113.

Although FIG. 1 shows content 145-146 of origin servers 140-141 being cached by data storage system 120, nodes 111-113 can handle other content. For example, dynamic content generated by activities of end user devices 130-132 need not originally reside on origin servers 140-141, and can be generated due to scripting or code included in web page content delivered by nodes 111-113. This dynamic content can also be cached by ones of nodes 111-113, and can be specific to a particular end user device during a communication session.

Management system 160 handles configuration changes and status information collection for the origin server operators or managers. For example, operator device 150 can transfer configuration 151 for delivery to management system 160, where configuration 151 can alter the handling of network content requests by nodes 111-113, among other operations. Also, management system 160 can monitor status information for the operation of nodes 111-113, such as operational statistics, and provide this status information as 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include many operator devices for receiving status information, providing configuration information, or transferring content to origin servers.

Figure 2:
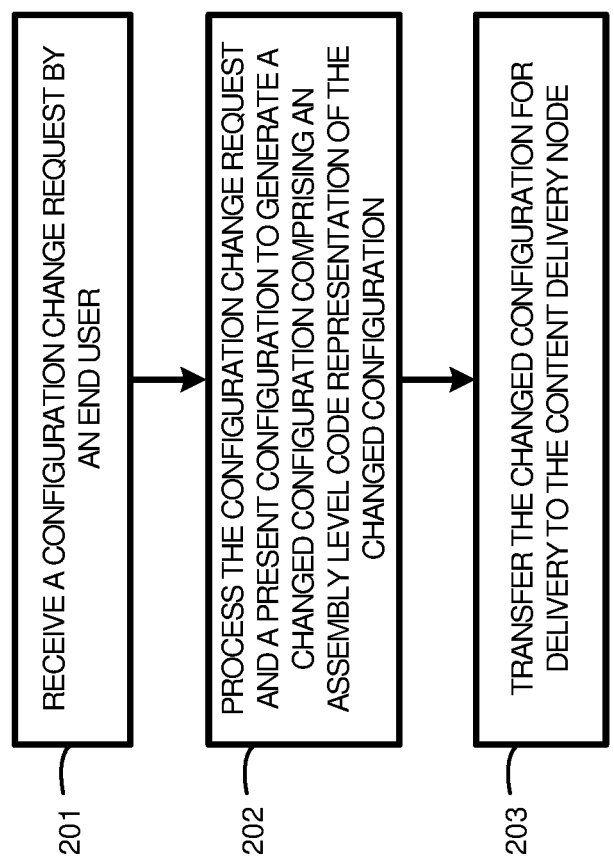
FIG. 2 is a flow diagram illustrating front-end logic changes.

FIG. 2 illustrates a flowchart for making front-end logic changes or content configuration changes to a content delivery node. Content configurations can include associations or correlations between content identifiers and content, such as web pages, video, pictures, music, and the like. For example, if a content request included a call for "www.epsilon.com," the content configuration within the content delivery node could associate the request to the appropriate content, and return the appropriate content to the requester.

To make the content configuration changes to the content delivery node, the method provides receiving a configuration change request by an end user at a translation node (201). The translation node can include configuration processing node 320, management system 160, among other variations. The configuration change request can be made through a web interface or any other method of requesting a content configuration change, and can include a request to change associations between content requests and content. For example, if a content association provides 'www.theta.com' to content A, then a configuration change request can include a request to change the association to content B. The method further provides processing the configuration change request and a present configuration to generate a changed configuration comprising an assembly level code representation of the changed configuration (202). In processing the configuration change request and the present configuration, the translation node will skip using compilable high-level languages, such as C language, C++ language, or other similar high-level languages to generate assembly code and instead directly generate assembly code based on the request. In some examples, the configuration change request can be processed with a present configuration that is already formatted in assembly code. Thus, both the present configuration and the changed configuration can be represented in assembly code. The method will then transfer the changed configuration for delivery to the content delivery node (203).

Figure 3:
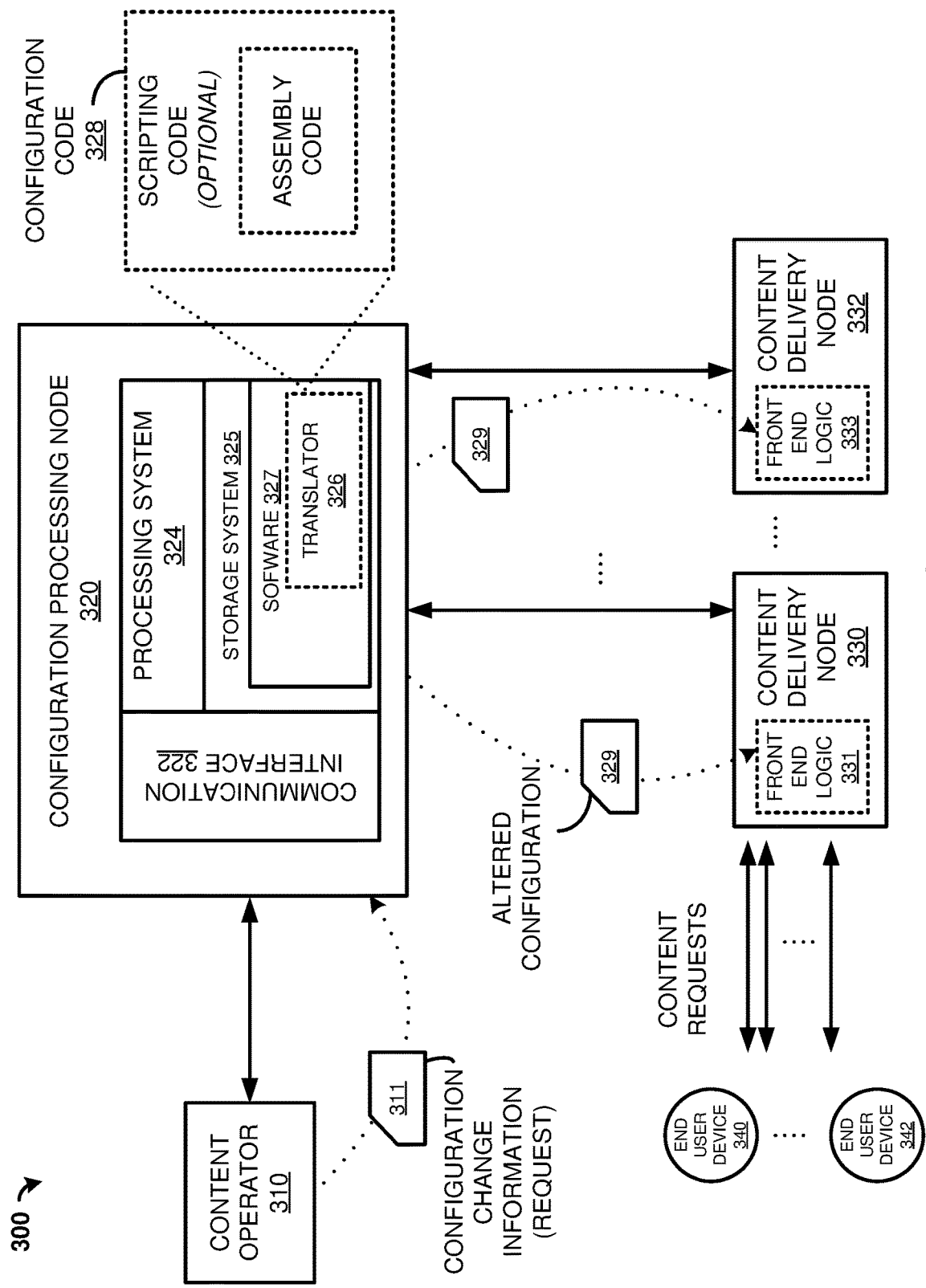
FIG. 3 is a block diagram illustrating a communication system.

In some instances, as illustrated in FIG. 3, the assembly code reflecting the changed configuration can be placed within scripting code. Scripting languages can include VCL, HTML, Perl, Javascript, among other scripting languages. Once embedded in the scripting code, the assembly code along with the scripting code can be processed into computer-executable code either by the translation node or the content delivery nodes.

FIG. 3 illustrates communication system 300 according to one example. System 300 includes a content operator device 310, configuration processing node 320, and content delivery nodes 330, 332. It should be understood that system 300 can include one or more content delivery nodes, one or more end user devices, and one or more content operator devices.

In operation, content operator device 310 can send configuration change information (request) 311. Configuration change information 311 can include altered or new relationships, correlations, or associations between content identifiers and content. For example, configuration change information 311 can indicate an IP address and network path is to be associated with a different set of content to be cached by a node instead of an initial set of content. Configuration change information 311 can include information related to associating content identifiers with content, such as a URL, URL association, configuration associated with a URL, IP address, network address, domain name, path names, content indicators, or other content change request information to configuration processing node 320. Content operator device 310 can include a content originator or a content manager, and can instruct configuration processing node 320 to implement a change or alteration to a present front-end logic configuration, or to create a new configuration. For example, content operator device 310 can instruct configuration processing node 320 to create or change an association between a URL and a content file.

Configuration change information 311 can be received by communication interface 322 of configuration processing node 320 and passed to translator 326 of processing system 324. Translator 326 can generate assembly code corresponding to, or based at least in part on, configuration change information 311 and a present configuration for a content delivery node. The new code can then be passed to content delivery nodes 330, 332 as altered configuration 329. Content delivery nodes 330, 332 include front-end logic 331, 333 that can use altered configuration 329 to handle content requests from end user devices 340-341.

In the example shown in FIG. 3, translator 326 generates configuration code 328. Configuration code 328 can comprise a scripting code and a low-level assembly code that reflects the configuration change request for the content delivery node. Scripting code, such as a computer-readable script, can be written in VCL, HTML, Perl, Javascript, among other scripting languages. Translator 326 can then generate computer-executable code based on configuration code 328 as altered configuration 329. Altered configuration 329 is then passed to the appropriate content delivery node. In some examples, translator 326 can transfer configuration code 328 to node 330, 332 where executable code can be generated. In other examples, the scripting code is not generated, and only the assembly code is generated and transferred to nodes 330, 332.

Configuration processing node 320 includes communication interface 322, processing system 324, storage system 325, software 327, and translator 326 in this example. Configuration processing node 320 can be an example of management node 160 of FIG. 1, although variations are possible.

In operation, processing system 324 is operatively linked to communication interface 322 and storage system 325. Processing system 324 is capable of executing software 327 stored in computer-readable media, such as that in storage system 325. When executing processing system 324, software 327, such as translator 326, directs configuration processing node 320 to operate as described herein. Configuration processing node 320 can also include other elements, such as user interfaces, computer systems, databases, distributed storage and processing elements, and other similar computing elements. In at least one instance, a user interface can be employed to receive content configuration change requests that can be implemented using translator 326.

Processing system 324 can be implemented within a single processing device, but can also be distributed across multiple processing devices or sub-systems that cooperate in executing program instructions. Examples of processing system 324 include general purpose central processing units, microprocessors, application specific processors, and logic devices, as well as any other type of processing device.

Communication interface 322 includes one or more network interfaces for communicating over communication networks, such as packet networks, the Internet, and the like. The network interfaces can include one or more local or wide area network communication interfaces, which can communicate over Ethernet or Internet protocol (IP) links. Examples of communication interface 322 include network interface card equipment, transceivers, modems, and other communication circuitry. In one example, communication interface 322 can be used to receive content configuration change requests from end users, such as content operator 310, and transfer altered configuration file 329 to one or more nodes. The content configuration change requests can be made through a web interface or any other method of requesting a content configuration change.

Storage system 325 can comprise any storage media readable by processing system 324 and capable of storing software 327. Storage system 325 can include volatile and nonvolatile, removable and non-removable media implemented in any method or technology for storage of information, such as computer readable instructions, data structures, program modules, or other data. Storage system 325 can be implemented as a single storage device but can also be implemented across multiple storage devices or sub-systems. Storage system 325 can comprise additional elements, such as controllers, capable of communicating with processing system 324. In some implementations, the storage media can be a non-transitory storage media. In some implementations, at least a portion of the storage media can be transitory. It should be understood that in no case are the storage media propagated signals.

Software stored on storage system 325 can comprise computer program instructions, firmware, or some other forms of machine-readable processing instructions that when executed by processing system 324 direct configuration processing node 320 to operate as described herein. For example, translator 326 directs configuration processing node 320 to receive configuration change requests, such as associations between content identifiers and content. Translator 326 can further be configured to processes the request to generate configuration code 328, generate executable code based on the assembly code as altered configuration 329, and pass the changed configuration to one or more content delivery nodes. Translator 326 can be configured to initiate further operations, such as those described for management system 160, or as further described in FIG. 3. Translator 326 can be implemented as a single application or as multiple applications. In general, the software can, when loaded into processing system 324 and executed, transform processing system 324 from a general-purpose device into a special-purpose device customized as described herein.

Figure 4:
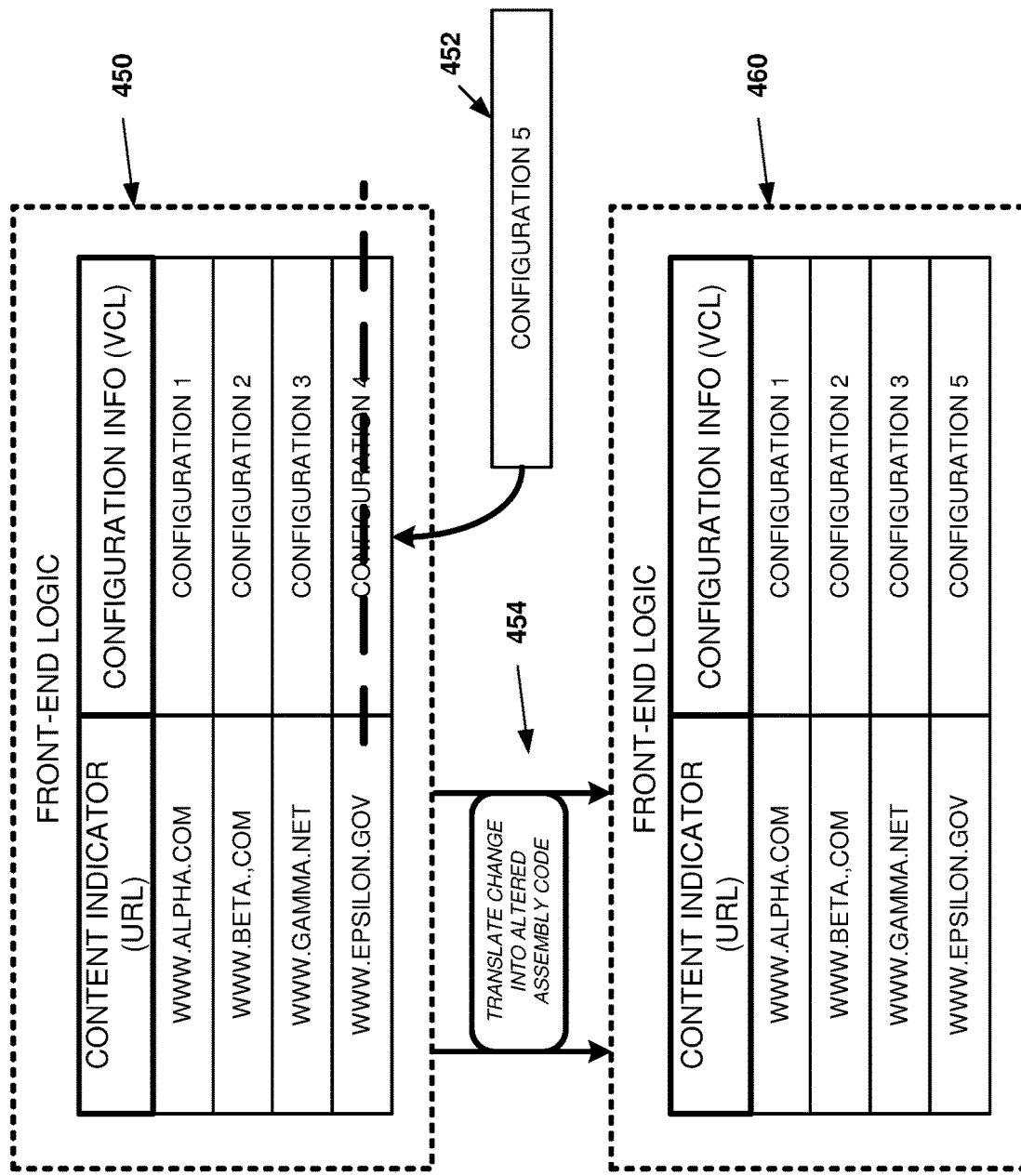
FIG. 4 is a block diagram illustrating front-end logic changes.

FIG. 4 is block diagram illustrating front-end logic changes according to an example. In this example, front-end logic 450 and 460 each represent a configuration for handling of content requests by a node, such as nodes 111-113 of FIG. 1 or nodes 330, 332 of FIG. 3. Front-end logic 450 and 460 can be generated by management node 160 of FIG. 1, translator 326 of FIG. 3, or by other systems. Once generated, front-end logic 450 and 460 can each comprise executable code, such as altered configuration 329, and be executed by front-end logic elements 331 and 333 of associated content delivery nodes 330 and 332 of FIG. 3.

In FIG. 4, first front-end logic 450 is shown. First, front-end logic 450 includes associations between content indicators (e.g. URLs) and configuration information (e.g. VCL files). In this example, front-end logic 450 is shown as a table relating each URL to a configuration, such as relating "www.alpha.com" to "configuration 1." When a node receives a content request for a particular URL, such as "www.beta.com," the node uses front-end logic 450 to determine if the URL exists within front-end logic 450, and if the URL does exist, then which configuration file or content is associated therewith, such as "configuration 2." The other URLs indicated in front-end logic 450 have similar associations.

When a new configuration or a configuration change is received, such as altered configuration 452, then new front-end logic 460 is implemented. Altered configuration 452 includes a replacement "configuration 5" which is intended to replace "configuration 4" of associated with the "www.epsilon.gov" URL. Front-end logic 460 is generated responsively, and includes the steps of generating assembly code reflective of the configuration change in operation 454. Front-end logic 460 includes "configuration 5" associated with "www.epsilon.gov" which replaces previous "configuration 4."

In one instance, a change in the configuration can include a change in the association of a content identifier, such as a URL, and a content path. For example, a content identifier, such as "www.epsilon.gov", can have a present configuration (configuration 4) that associates the URL to a first content, such as a first picture, article, and the like stored on the content delivery node. The configuration change, to "configuration 5", can then allow the URL to associate to a secondary content, which can include a second picture, article, and the like. In another instance, a content configuration change can include adding another content identifier, such as a URL, to point to new cached content. Thus, both the added URL and the added content will comprise the content configuration change.

Referring back to FIG. 1, nodes 111-113, origin servers 140-141, and management system 160, can each include communication interfaces, network interfaces, processing systems, computer systems, microprocessors, storage systems, storage media, or some other processing devices or software systems, and can be distributed among multiple devices. Examples of nodes 111-113, origin servers 140-141, and management system 160 can each include software such as an operating system, logs, databases, utilities, drivers, caching software, networking software, and other software stored on a computer-readable medium. Content delivery system 110, in addition to including nodes 111-113, can include equipment and links to route communications between nodes 111-113 and any of end user devices 130-132, origin servers 140-141, and management system 160, among other operations.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links. Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for updating configurations in a content delivery network, the method comprising:
    receiving a request to implement a change to a present configuration on a plurality of nodes in the content delivery network;
    generating a configuration change comprising an assembly code representation of the change to the present configuration;
    translating the configuration change into executable code;
    generating an update to the present configuration that comprises the executable code; and
    transferring the update to the present configuration to the plurality of nodes.

2. The method of claim 1 wherein the change to the present configuration comprises a change to an association between content requests and content cached by the plurality of nodes on behalf of an origin server.

3. The method of claim 2 wherein the assembly code representation of the change to the present configuration comprises an assembly code representation of the change to the association between the content requests and the content.

4. The method of claim 3 wherein the configuration change further comprises scripting code having the assembly code embedded therein.

5. The method of claim 4 wherein translating the configuration change into the executable code comprises translating the scripting code and the assembly code into the executable code.

6. The method of claim 5 wherein the generating the configuration change comprises generating the assembly code directly from the request.

7. The method of claim 6 wherein generating the assembly code directly from the request comprises generating the assembly code from the request without utilizing any higher-level languages.

8. An apparatus comprising:
one or more non-transitory computer readable storage media;
a processing system, comprising a processor, operatively coupled with the one or more computer readable storage media; and
program instructions stored on the one or more computer readable storage media that, when executed by the processing system, direct the processing system to at least:
receive a request to implement a change to a present configuration on a plurality of nodes in the content delivery network;
generate a configuration change comprising an assembly code representation of the change to the present configuration;
translate the configuration change into executable code;
generate an update to the present configuration that comprises the executable code; and
transfer the update to the present configuration to the plurality of nodes.

9. The apparatus of claim 8 wherein the change to the present configuration comprises a change to an association between content requests and content cached by the plurality of nodes on behalf of an origin server.

10. The apparatus of claim 9 wherein the assembly code representation of the change to the present configuration comprises an assembly code representation of the change to the association between the content requests and the content.

11. The apparatus of claim 10 wherein the configuration change further comprises scripting code having the assembly code embedded therein.

12. The apparatus of claim 11 wherein to translate the configuration change into the executable code, the program instructions direct the processing system to translate the scripting code and the assembly code into the executable code.

13. The apparatus of claim 12 wherein to generate the configuration change, the program instructions direct the processing system to generate the assembly code directly from the request.

14. The apparatus of claim 13 wherein to generate the assembly code directly from the request, the program instructions direct the processing system to generate the assembly code from the request without utilizing any higher-level languages.

* * * * *